US009509882B2

(12) United States Patent  
Reed et al.

(10) Patent No.: US 9,509,882 B2  
(45) Date of Patent: Nov. 29, 2016

(54) STEGANOGRAPHIC ENCODING AND DECODING

(71) Applicant: Digimarc Corporation, Beaverton, OR (US)

(72) Inventors: Alastair M. Reed, Lake Oswego, OR (US); Ravi K. Sharma, Portland, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 14/936,263

(22) Filed: Nov. 9, 2015

(65) Prior Publication Data

US 2016/0156805 A1 Jun. 2, 2016

Related U.S. Application Data

(60) Continuation of application No. 14/565,092, filed on Dec. 9, 2014, now Pat. No. 9,185,260, which is a continuation of application No. 13/936,766, filed on Jul. 8, 2013, now Pat. No. 8,908,908, which is a (Continued)

(51) Int. Cl.
*G06T 1/00* (2006.01)
*H04N 1/32* (2006.01)
(Continued)

(52) U.S. Cl.
CPC .......... *H04N 1/32309* (2013.01); *G06T 1/005* (2013.01); *G06T 1/0021* (2013.01); *G06T 11/001* (2013.01); *H04N 1/32144* (2013.01); *H04N 1/32267* (2013.01); *H04N 1/6005* (2013.01); *H04N 1/6008* (2013.01); *G06T 2201/0083* (2013.01); *H04N 2201/327* (2013.01); *H04N 2201/3228* (2013.01); *H04N 2201/3233* (2013.01)

(58) Field of Classification Search
CPC ... G06T 1/0021; G06T 1/0028; G06T 1/005; G06T 2201/005; G06T 2201/0202; H04N 1/32229; H04N 1/32309; H04N 1/3232; H04N 1/32352

See application file for complete search history.

(56) References Cited

U.S. PATENT DOCUMENTS 4,807,031 A 2/1989 Broughton et al. .......... 358/142
5,652,626 A 7/1997 Kawakami et al. .......... 348/463

(Continued)

OTHER PUBLICATIONS

U.S. Appl. No. 14/294,845, filed Jun. 3, 2014.

(Continued)

*Primary Examiner* — Andrew W Johns
(74) *Attorney, Agent, or Firm* — Digimarc Corporation

(57) ABSTRACT

This patent document relates generally to steganography and digital watermarking. One claim recites an apparatus comprising: electronic memory for buffering samples corresponding to a digital image; means for analyzing a digital image relative to an expected workflow process, the expected workflow process comprising optical capture of a printed version of the digital image, the digital image comprising data representing process colors CMY; means for applying tone correction to the digital image, said means for applying yielding an altered digital image; means for transforming the altered digital image with digital watermarking, the digital watermarking conveying a plural-bit message; and a processor configured for providing the transformed, altered digital image. Of course, other claims and combinations are provided too.

21 Claims, 17 Drawing Sheets

Related U.S. Application Data division of application No. 12/708,278, filed on Feb. 18, 2010, now Pat. No. 8,515,120, which is a continuation of application No. 11/143,088, filed on Jun. 1, 2005, now Pat. No. 7,668,334.

(60) Provisional application No. 60/585,490, filed on Jul. 2, 2004, provisional application No. 60/620,093, filed on Oct. 18, 2004, provisional application No. 60/642,915, filed on Jan. 10, 2005.

(51) Int. Cl.
*G06T 11/00* (2006.01)
*H04N 1/60* (2006.01)

(56) References Cited

U.S. PATENT DOCUMENTS

| | | | | |
|---|---|---|---|---|
| 5,719,966 | A | 2/1998 | Brill et al. | 382/260 |
| 5,721,788 | A | 2/1998 | Powell et al. | 382/100 |
| 5,862,260 | A | 1/1999 | Rhoads | 382/232 |
| 5,893,101 | A | 4/1999 | Balogh et al. | 707/100 |
| 5,946,414 | A * | 8/1999 | Cass et al. | 382/183 |
| 5,949,055 | A | 9/1999 | Fleet et al. | 235/469 |
| 6,061,793 | A | 5/2000 | Tewfik et al. | 713/176 |
| 6,122,403 | A | 9/2000 | Rhoads | 382/233 |
| 6,181,802 | B1 | 1/2001 | Todd | 382/100 |
| 6,201,879 | B1 | 3/2001 | Bender et al. | 382/100 |
| 6,226,387 | B1 | 5/2001 | Tewfik et al. | 382/100 |
| 6,307,949 | B1 | 10/2001 | Rhoads | 382/100 |
| 6,334,187 | B1 | 12/2001 | Kadono | 713/176 |
| 6,408,082 | B1 | 6/2002 | Rhoads et al. | 382/100 |
| 6,590,996 | B1 | 7/2003 | Reed et al. | 382/100 |
| 6,614,914 | B1 | 9/2003 | Rhoads et al. | 382/100 |
| 6,631,198 | B1 | 10/2003 | Hannigan et al. | 382/100 |
| 6,633,654 | B2 | 10/2003 | Hannigan et al. | 382/100 |
| 6,636,615 | B1 * | 10/2003 | Rhoads et al. | 382/100 |
| 6,674,874 | B1 | 1/2004 | Yoshida et al. | 382/100 |
| 6,700,995 | B2 | 3/2004 | Reed | 382/100 |
| 6,763,124 | B2 | 7/2004 | Alattar et al. | 382/100 |
| 6,804,377 | B2 | 10/2004 | Reed et al. | 382/100 |
| 7,443,537 | B2 | 10/2008 | Reed | 358/1.9 |
| 7,668,334 | B2 | 2/2010 | Reed et al. | 382/100 |
| 7,916,354 | B2 | 3/2011 | Rhoads | 358/3.28 |
| 7,995,790 | B2 | 8/2011 | Reed et al. | 382/100 |
| 8,009,324 | B2 | 8/2011 | Reed | 358/1.9 |
| 8,051,295 | B2 | 11/2011 | Brunk et al. | 713/176 |
| 8,094,869 | B2 | 1/2012 | Reed et al. | 382/100 |
| 8,144,368 | B2 | 3/2012 | Rodriguez et al. | 358/3.28 |
| 8,155,378 | B2 | 4/2012 | Reed et al. | 382/100 |
| 8,199,969 | B2 | 6/2012 | Reed | 382/100 |
| 8,515,120 | B2 | 8/2013 | Reed et al. | 382/100 |
| 8,744,120 | B2 | 6/2014 | Reed et al. | 382/100 |
| 8,908,908 | B2 | 12/2014 | Reed et al. | G06T 1/0021 |
| 8,983,120 | B2 | 3/2015 | Reed et al. | G06T 1/0021 |
| 9,185,260 | B2 | 11/2015 | Reed et al. | H04N 1/32309 |
| 9,282,216 | B2 | 3/2016 | Reed et al. | H04N 1/32309 |
| 2002/0126873 | A1* | 9/2002 | Alattar et al. | 382/100 |
| 2003/0016841 | A1* | 1/2003 | Reed et al. | 382/100 |
| 2003/0152225 | A1* | 8/2003 | Kunisa | 380/210 |
| 2005/0169499 | A1* | 8/2005 | Rodriguez et al. | 382/100 |

OTHER PUBLICATIONS

U.S. Appl. No. 60/585,490, filed Jul. 2, 2004.
U.S. Appl. No. 60/620,093, filed Oct. 18, 2004.
U.S. Appl. No. 60/642,915, filed Jan. 10, 2005.
Autrusseau et al., "A Psychovisual Approach for Watermarking", Proceedings of SPIE vol. 4314, 2001, pp. 495-504.
Bartens, "Contrast Sensitivity of the Human Eye and It's Effects on Image Quality", pp. 147-151, SPIE Press, 1999.
Battiato et. al. "Robust Watermarking for Images Based on Color Manipulation", Third Int. Image Hiding Workshop 1999.
Cox, et al, "Preprocessing media to facilitate later insertion of a watermark," DSP 2002, Santorini, Greece, Jul. 1-3, 2002.
Delaigle, et al., "Watermarking Algorithm Based on a Human Visual Model", Signal Processing, Oct. 1998, 23 pages.
De Rosa, et al., "Watermark Capacity Measure Incorporating a Model of the Human Visual System", Proceedings of SPIE vol. 4314, 2001, pp. 483-494.
Fleet et al., "Embedding Invisible Information in Color Images," IEEE Int. Conf. on Image Proc., Oct. 1997, vol. 1, pp. 532, 535.
Gilani et al., "Color Image-Adaptive Watermarking," 2002 IEEE, 4 pages.
McDowell, "Color Management: What's New from the ICC," The Pre-Press Bulletin, pp. 4-8, Nov./Dec. 2001.
Alattar, "'Smart Images' Using Digimarc's Watermarking Technology," Proc. IS&T/SPIE's 12th International Symposium on Electronic Imaging, vol. 3971, No. 25, pp. 264-273, Jan. 2000.
Bradley et al., "Comparative performance of watermarking, schemes using M-ary modulation with Binary schemes employing error correction coding," Proc, SPIE Electronic Imaging, Security and Watermarking of Multimedia Content III, vol. 4314, San Jose, CA, Jan. 2001.
Piva et al., "Exploiting the Cross-Correlation of RGB-Channels for Robust Watermarking of Color Images," 1999 IEEE, pp. 306-310.
Podilchuk et al., "Image-Adaptive Watermarking Using Visual Models", 1998, 37 pages.
Kutter et al., "Digital Signature of Color Images Using Amplitude Modulation," SPIE vol. 3022, 1997, pp. 518-526.
Vidal et al., "Non-Noticeable Information Embedding in Color Images: Marking and Detection," IEEE (1999), pp. 293-297.

* cited by examiner

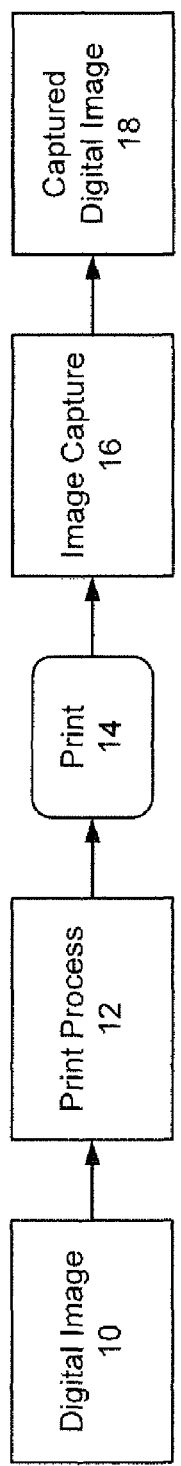
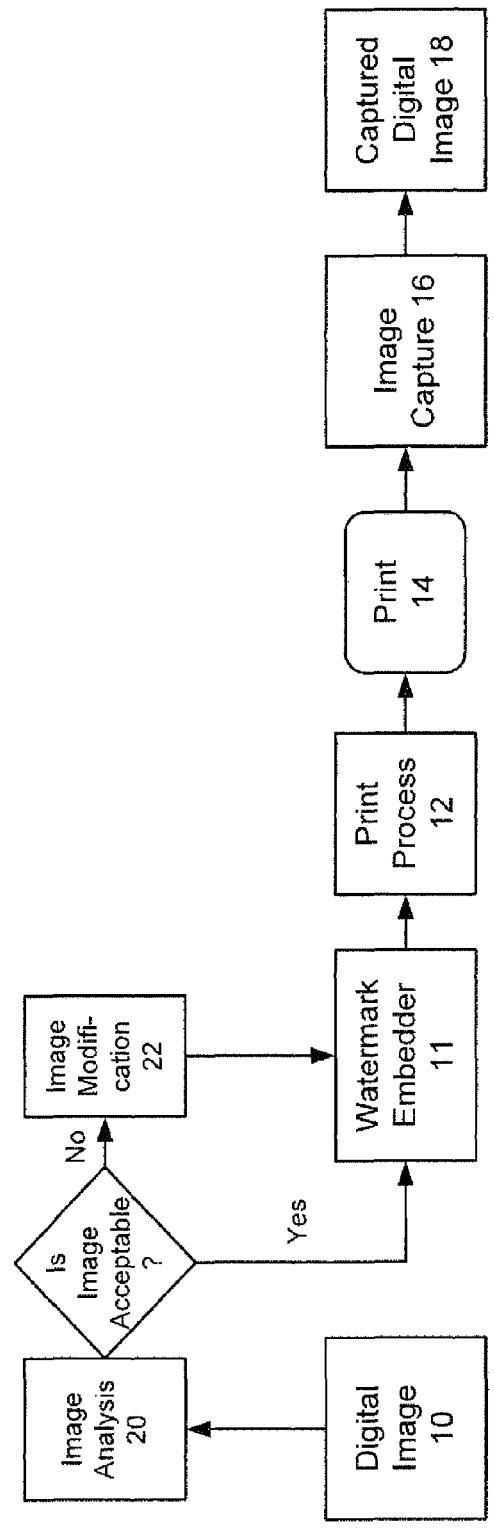
FIG. 1A
FIG. 1B

STEGANOGRAPHIC ENCODING AND DECODING

RELATED PATENT DATA

This application is a continuation of U.S. patent application Ser. No. 14/565,092, filed Dec. 9, 2014 (U.S. Pat. No. 9,185,260) which is a continuation of U.S. patent application Ser. No. 13/936,766, filed Jul. 8, 2013 (U.S. Pat. No. 8,908,908) which is a division of U.S. patent application Ser. No. 12/708,278, filed Feb. 18, 2010 (U.S. Pat. No. 8,515,120), which is a continuation of U.S. patent application Ser. No. 11/143,088, filed Jun. 1, 2005 (U.S. Pat. No. 7,668,334), which claims the benefit of U.S. Provisional Patent Application Nos. 60/585,490, filed Jul. 2, 2004; 60/620,093, filed Oct. 18, 2004; and 60/642,915, filed Jan. 10, 2005.

The present application is also related to U.S. Pat. Nos. 6,700,995; 6,590,996 and 6,307,949.

Each of the U.S. patent documents mentioned in this application is hereby incorporated by reference.

TECHNICAL FIELD

The present disclosure relates generally to digital watermarking. In particular, the present disclosure relates to modifying imagery to better receive digital watermarking.

BACKGROUND AND SUMMARY

Not all images are suitable to receive digital watermarking. Some images are too light (e.g., "washed out") or have a large percentage of pixels that include high saturation. Other images may be too dark to effectively receive digital watermarking. The present disclosure provides methods and apparatus to modify an image to better receive digital watermarking. The methods and apparatus can be integrated into image workflows and only modify those images that may be sub par in terms of their ability to receive and hide digital watermarking. One example workflow is image capture for identification documents (e.g., at DMV station or passport application process). Another example is a photography studio during its print (or proofs) process. Of course, these are but a few of the many environments in which our inventive techniques will benefit.

Digital watermarking technology, a form of steganography, encompasses a great variety of techniques by which plural bits of digital data are hidden in some other object, preferably without leaving human-apparent evidence of alteration.

Digital watermarking may be used to modify media content to embed a machine-readable code into the media content. The media may be modified such that the embedded code is imperceptible or nearly imperceptible to the user, yet may be detected through an automated detection process.

There are many processes by which media can be processed to encode a digital watermark. In physical objects, the data may be encoded in the form of surface texturing or printing. Such marking can be detected from optical scan data, e.g., from a scanner or web cam. In electronic objects (e.g., digital audio or imagery—including video), the data may be encoded as slight variations in sample values. Or, if the object is represented in a so-called orthogonal domain (also termed "non-perceptual," e.g., MPEG, DCT, wavelet, etc.), the data may be encoded as slight variations in quantization values or levels. The assignee's U.S. Pat. Nos. 6,122,403 and 6,614,914 are illustrative of certain watermarking technologies. Still further techniques are known to those of ordinary skill in the watermarking art.

Digital watermarking systems typically have two primary components: an embedding component that embeds a watermark in the media content, and a reading component that detects and reads the embedded watermark. The embedding component embeds a watermark pattern by altering data samples of the media content. The reading component analyzes content to detect whether a watermark pattern is present. In applications where the watermark encodes information, the reading component extracts this information from the detected watermark.

One problem that arises in many watermarking applications is that of object corruption. If the object is reproduced, or distorted, in some manner such that the content presented for watermark decoding is not identical to the object as originally watermarked, then the decoding process may be unable to recognize and decode the watermark. To deal with such problems, the watermark can convey a reference signal or "orientation component." The orientation component is of such a character as to permit its detection even in the presence of relatively severe distortion. Once found, the attributes of the distorted reference signal can be used to quantify the content's distortion. Watermark decoding can then proceed—informed by information about the particular distortion present.

The Assignee's U.S. Pat. Nos. 6,614,914 and 6,408,082 detail orientation components, and processing methods, that permit such watermark decoding even in the presence of distortion. In some image watermarking embodiments, an orientation component comprises a constellation of quasi-impulse functions in the Fourier magnitude domain, each with pseudorandom phase. To detect and quantify the distortion, the watermark decoder converts the watermarked image to the Fourier magnitude domain and then performs a log polar resampling of the Fourier magnitude image. A generalized matched filter correlates a known orientation signal with the re-sampled watermarked signal to find the rotation and scale parameters providing the highest correlation. The watermark decoder performs additional correlation operations between the phase information of the known orientation signal and the watermarked signal to determine translation parameters, which identify the origin of the watermark message signal. Having determined the rotation, scale and translation of the watermark signal, the reader then adjusts the image data to compensate for this distortion, and extracts the watermark message signal.

One aspect of the present disclosure is a method to condition an image prior to receiving steganographic encoding. The process includes receiving an image and subjecting the image to an approximation of an expected workflow process. The subjected image is evaluated to determine whether the image includes characteristics that are conducive to receive steganographic encoding in view of the expected workflow process. If the digital image is not conducive, the image is modified.

Another aspect of the present disclosure is a method to analyze a digital image to determine whether the digital image will be a suitable host to receive digital watermarking. The method includes processing a digital image in accordance with an approximation of an expected workflow process, and analyzing the processed digital image to determine whether the digital image forms a suitable host to receive digital watermarking. If the digital image is not suitable, the digital image is modified to better receive digital watermark in anticipation of the expected workflow process.

Additional features, aspects and advantages of the present technology will become even more apparent with reference to the following detailed description and accompanying drawings.

BRIEF DESCRIPTION OF THE DRAWINGS

FIG. 1A illustrates an example image workflow.

FIG. 1B illustrates image analysis and modification for the workflow of FIG. 1A.

(FIG. 23 corresponds to FIG. 1 in priority application No. 60/620,093, filed Oct. 18, 2004.)

(FIG. 24 corresponds to FIG. 2 in priority application No. 60/620,093, filed Oct. 18, 2004.)

DETAILED DESCRIPTION

Figure 2:
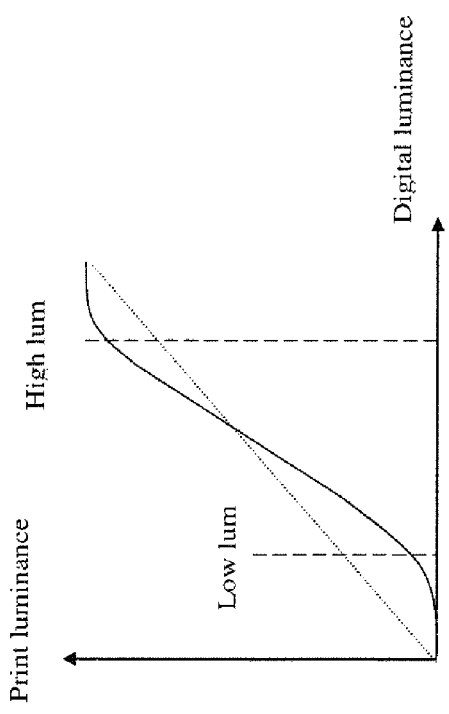
FIG. 2 illustrates a response curve for an expected image capture device and printer.

FIG. 1A illustrates a conventional image workflow. A digital image 10 is received. For example, the image is captured by a digital camera, converted to a digital image from conventional film, or obtained via an optical scanning device. The digital image 10 is printed by printer 12 onto a substrate 14. For example, if digital image 10 includes a photograph, it may be printed onto an identification document, such as a passport, driver's license or other photo ID. Printed substrate 14 is expected to be eventually captured by an image capture device 16 (e.g., an optical sensor, scanner, digital camera, cell phone camera, etc.). The image capture device 16 produces a digital representation 18 of substrate 14, including a representation of digital image 10 printed thereon.

We can make predictions of resulting image quality based on components (e.g., printer 12 and capture device 16) in a workflow. Moreover, we can make predictions of a workflow system to even more successfully embed and read digital watermarks.

In an ideal image workflow system all components of a digital watermark embedder and reader systems are preferably modeled as approximately linear, and all watermarked images read in a similar manner (e.g., assuming equal watermark embedding strength).

In practice, however, a linear model fails due to non-linearity introduced in capture and print devices. Non-linearity of a capture and print device can be compensated for by characterizing the devices and compensating for their response (see, e.g., Assignee's U.S. Pat. No. 6,700,995 and U.S. patent application Ser. No. 10/954,632, filed Sep. 29, 2004 (now U.S. Pat. No. 7,443,537), which are herein incorporated by reference.).

But in many cases the watermark capture and/or print device are outside the control of a watermarking application.

In these cases a captured image is preferably analyzed for its ability to carry and conceal a watermark, taking into account an anticipated response of an output printer and capture device.

If a predetermined proportion of image pixels are of a level (e.g., color or grayscale level) that will not be correctly measured or represented by the output device/capture device then image correction or modification is applied. The correction preferably minimizes a visual impact attributable to watermarking, but still allows an embedded watermark to read by ensuring that about 50-85% of the pixels in the image are in an approximately linear section of a print device. (We most prefer that at least 70% of the pixels fall within the approximately linear section of the print device.).

With reference to FIG. 1B, we insert image analysis 20 and image modification 22 modules into the workflow of FIG. 1A. Image analysis 20 determines whether the digital image 10, if subjected to an anticipated print process (e.g., process 12) and eventual image capture (e.g., process 16), will provide a suitable environment for digital watermarking. If the digital image is acceptable, flow continues to a digital watermark embedder 11, where the digital image is embedded with one or more digital watermarks. Otherwise the digital image is modified 22 to provide more favorable image characteristics. A modified digital image is provided to the digital watermark embedder 11. The embedded image is printed. (While the analysis 20 and modification 22 can be manually preformed, e.g., via photo editing software like Adobe's PhotoShop, we prefer an automated the process. For example, the analysis 20 and modification 22 can be dedicated software modules and incorporated into an SDK or application program.).

FIG. 2 illustrates a printer/scanner curve, which models anticipated characteristics of (and/or corruption introduced by) printer 12 and scanner 16. We use the printer/scanner curve to estimate how a particular digital image will respond when subjected to the printer 12 and eventual scanning 16. As discussed in Appendix A, a response curve can be generated by printing a range of test patterns on the printer 12 and scanning in the printed test patterns via scanner 16. The scanned in test patterns are analyzed to model the workflow process (e.g., printer 12 and scanner 16). Results of this process are represented in the response curve FIG. 2 (e.g., in terms of luminance, or defining a range of pixel values that fall within a linear region). In other implementations we represent the workflow response as a data file or equations, etc.

Figure 3A:
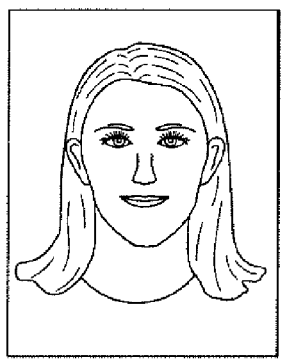
FIG. 3A illustrates an image including areas susceptible to washing out with workflow processing.
Figure 3B:
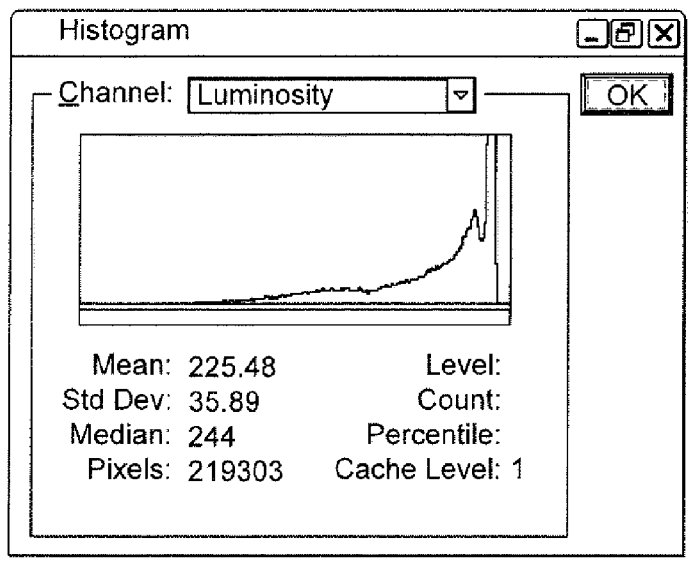
FIG. 3B illustrates a corresponding luminosity histogram.
Figure 3C:
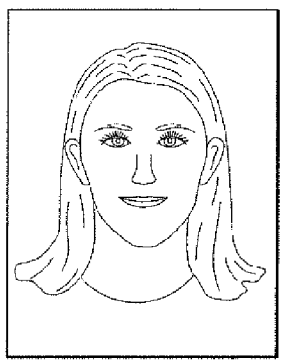
FIG. 3C illustrates the FIG. 3A image after processing according to the FIG. 2 curve.

To illustrate further consider the image shown in FIG. 3A. After passing through (or analysis relative to) the printer/scanner response curve (FIG. 2), a resulting image will appear washed-out or faded as shown in FIG. 3C. A luminosity histogram corresponding to FIG. 3A is shown in FIG. 3B. The percentage of pixels in the range from low_lum to high_lum (e.g., defined by the range shown between dashed lines in FIG. 2) is only about 16% in this case. The large number of pixels in the highlight or high luminance areas creates an image which appears washed-out. This image will have a hard time effectively hosting digital watermarking, once it passes through the expected print/scan process, since a high number of its pixels correspond to a non-linear portion of the printer curve (FIG. 3B). To compensate for these anticipated problems, tone correction is applied to bring a predetermined number of image pixels into the linear region of the printer/scanner (e.g., between the dashed lines shown in FIG. 2). While we prefer to bring at least 70% of the pixels within this linear region, we can accept a range having a lower boundary of approximately 50% of pixels within the linear region.

Figure 4:
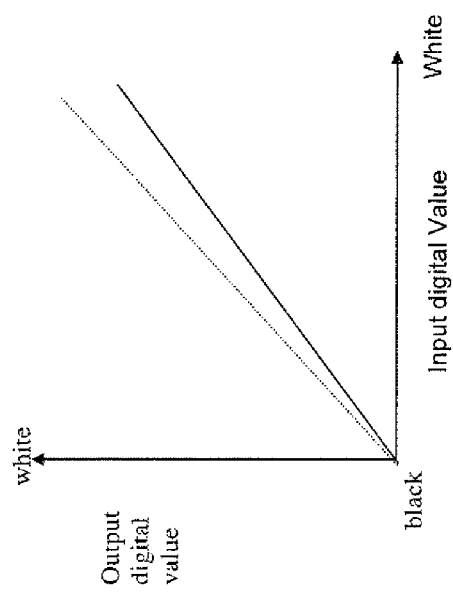
FIG. 4 illustrates tone correction for washed-out images.

We correct the tone of the image shown in FIG. 3A according to a curve shown in FIG. 4. The dashed line in FIG. 4 represents preferred image tone, while the solid line represents the actual image tone. The FIG. 3A image is tone corrected, e.g., pixel values are reduced. This process moves the solid line more toward the dashed line in FIG. 4. This tone correction process brings a predetermined number of pixels (e.g., 70%) into the desired linear range. For example, a predetermined number of pixels now fall between the dashed lines of FIG. 2. The tone correction is preferably applied to the red, green and blue channels (or CYMK channels, etc.). Tone correction can be automated using conventional software such as Adobe's PhotoShop. Of course, software modules (e.g., C++) can be written to accomplish the same task.

Figure 5A:
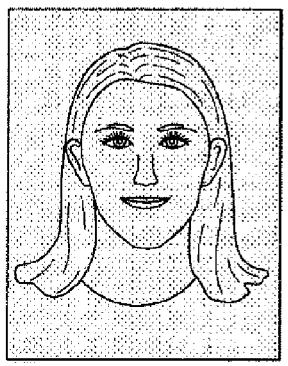
FIG. 5A illustrates the FIG. 3A image after applying the tone correction of FIG. 4.
Figure 5B:
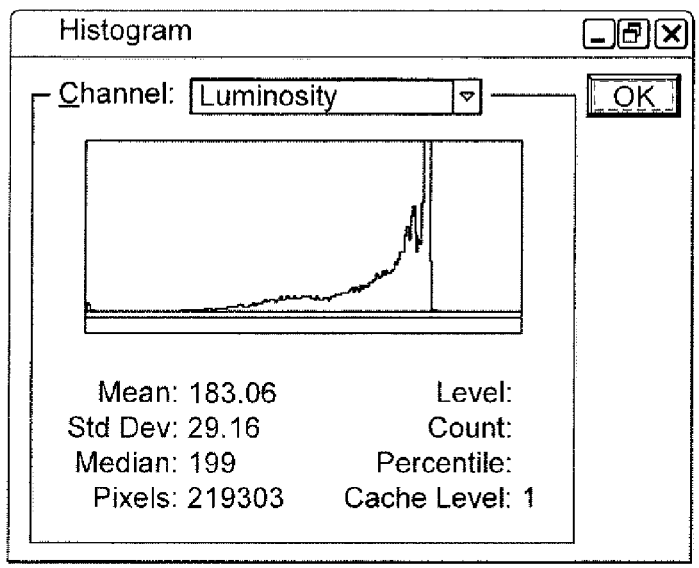
FIG. 5B illustrates a corresponding luminosity histogram.
Figure 5C:
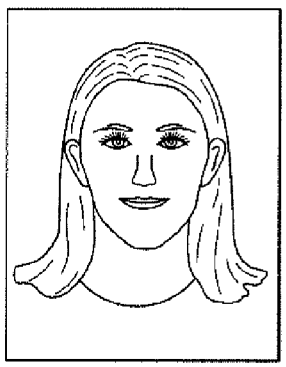
FIG. 5C illustrates the FIG. 5A image after processing according to the FIG. 2 curve.

A resulting image—after tone correction—is shown in FIG. 5A. We pass the modified FIG. 5A image through (or analyze relative to) the printer/scanner response curve (FIG. 2) to determine whether the modified image (FIG. 5A) will provide a sufficient watermark hosting environment when subjected to printer 12 and scanner 16. A resulting image—after passing through the response curve—is shown in FIG. 5C. The FIG. 5A image is deemed to have acceptable characteristics. (FIG. 5A luminosity features are shown in FIG. 5B. A comparison between FIG. 5B and FIG. 3B helps to illustrate that the overall highlight pixels in FIG. 5A have been reduced compared to FIG. 3A). We determine that the FIG. 5C image is better able to host a watermark—in comparison to FIG. 3C—and is also more visually pleasing.

Figure 6A:
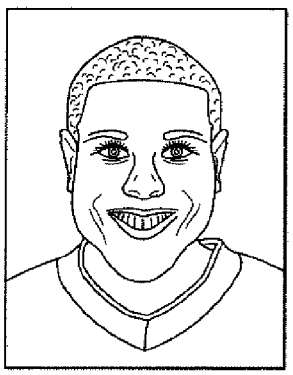
FIG. 6A illustrates an image including relatively darker image regions.
Figure 6B:
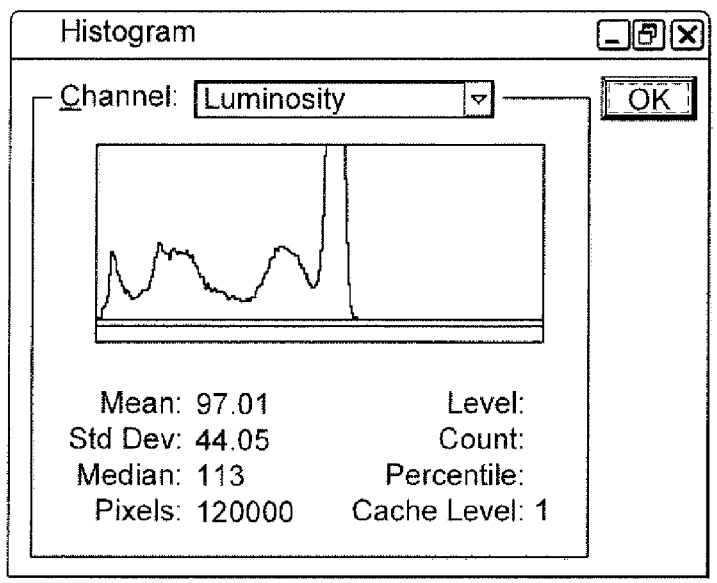
FIG. 6B illustrates a corresponding luminosity histogram.
Figure 6C:
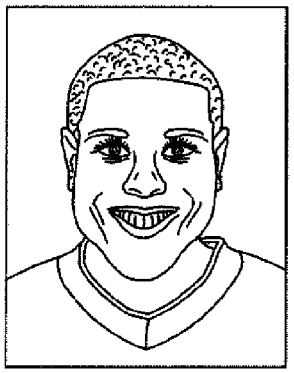
FIG. 6C illustrates the FIG. 6A image after processing according to the FIG. 2 curve.
Figure 7:
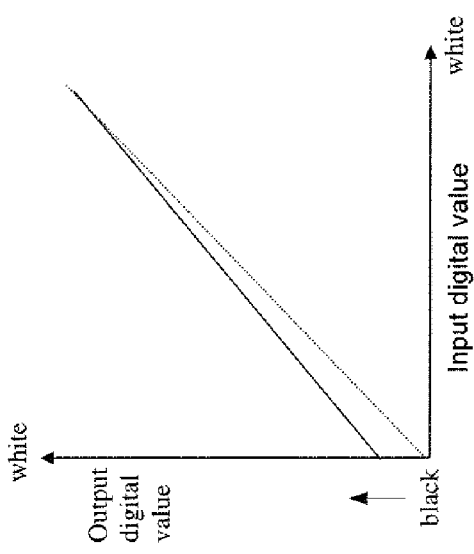
FIG. 7 illustrates tone correction for images including dark or shadow regions.

Correction can improve images with larger shadow regions also. The image represented in FIG. 6A is passed through (or analyzed relative to) the printer/scanner response curve (FIG. 2), which results in the FIG. 6C image. (FIG. 6A luminosity is shown in FIG. 6B.). We determine that we need to move pixels from the low luminance (or shadow region) into a more linear region of the printer/scanner. For this case, a shadow tone correction is performed as shown in FIG. 7. The solid line representing image pixels values are changed to move the pixel values toward the dashed line.

Figure 9:
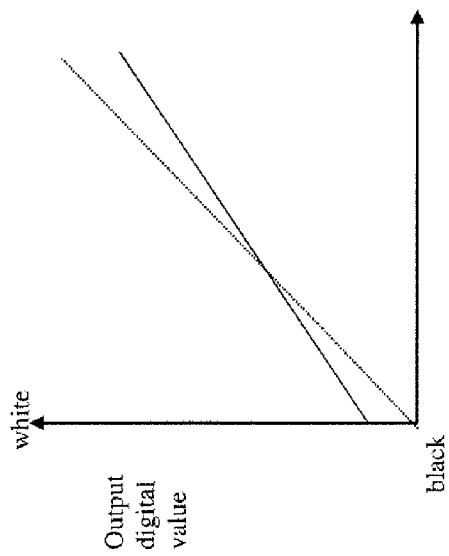
FIG. 9 illustrates tone correction for an image including both washed-out regions and darker image regions.
Figure 8:
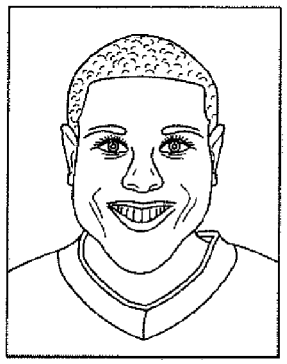
FIG. 8 illustrates an image including both washed-out regions and relatively darker image regions.

The above two situations (washed out and darker regions) are sometimes found in the same image. For example, consider FIG. 8, which includes a combination of darker and lighter areas. Again the FIG. 2 printer/scanner curve is used for evaluation, and again we determine that correction is needed. This time we apply tone correction shown in FIG. 9. This correction moves pixel value from both highlights and shadows toward the preferred dashed line.

Figure 10:
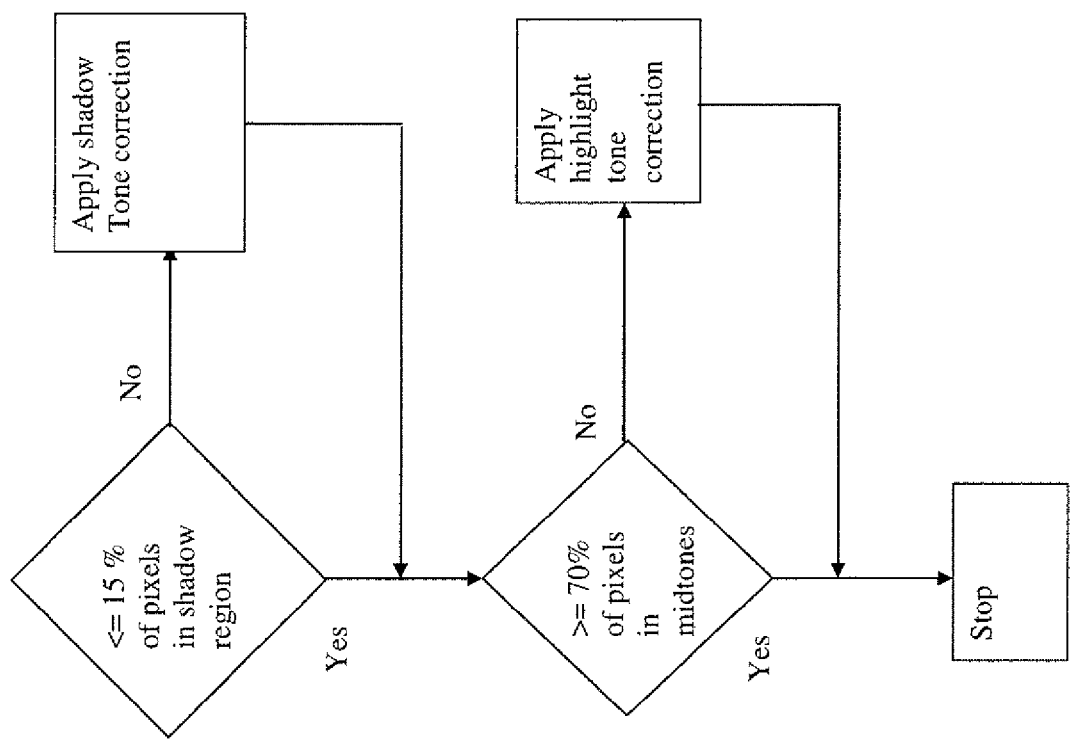
FIG. 10 is a flow diagram for image analysis.

FIG. 10 illustrates a process to help determine whether correction is needed for a particular image. This process can be automated using software and/or hardware. An image is analyzed to determine pixel values. The process determines whether a predetermined number of pixel values fall within a shadow region (e.g., as illustrated, <=15%). The shadow region is preferably identified by a value of low luminance (e.g., see FIG. 2) relative to an expected workflow process. This is the lower level at which the system exhibits non-linear behavior. If not within this limit, shadow tone correction is applied. In a first and preferred implementation, all image pixels are tone corrected. In a second implementation only a subset of image pixels are tone corrected. For example, only those pixels having predetermined pixel value (here, at this stage, a low pixel value) are adjusted. Similarly, it is determined whether a predetermined number of pixels fall within predetermined midtone ranges (e.g., as illustrated, >=70%). These ranges are preferably determined by reference to the response curve of FIG. 2 (e.g., the area falling within the two dashed lines.) If not, highlight tone correction is applied. As discussed above, we prefer that all image pixels are tone corrected.

A predetermined number of pixels can be determined according to a number of factors, e.g., visibility constraints, watermark detection rates needed, aesthetic considerations, etc. If modification is preformed, the process can be repeated to ensure desired image characteristics. (Image modification is preferably automatically applied prior to watermark embedding, which results in more consistent watermark detection for otherwise poor images.)

Returning to FIG. 1B, an acceptable image 10—an image including a predetermined number of pixels falling within a reasonable tonal range relative to an expected response of a workflow—passes unchanged to the printer 12.

Figure 11:
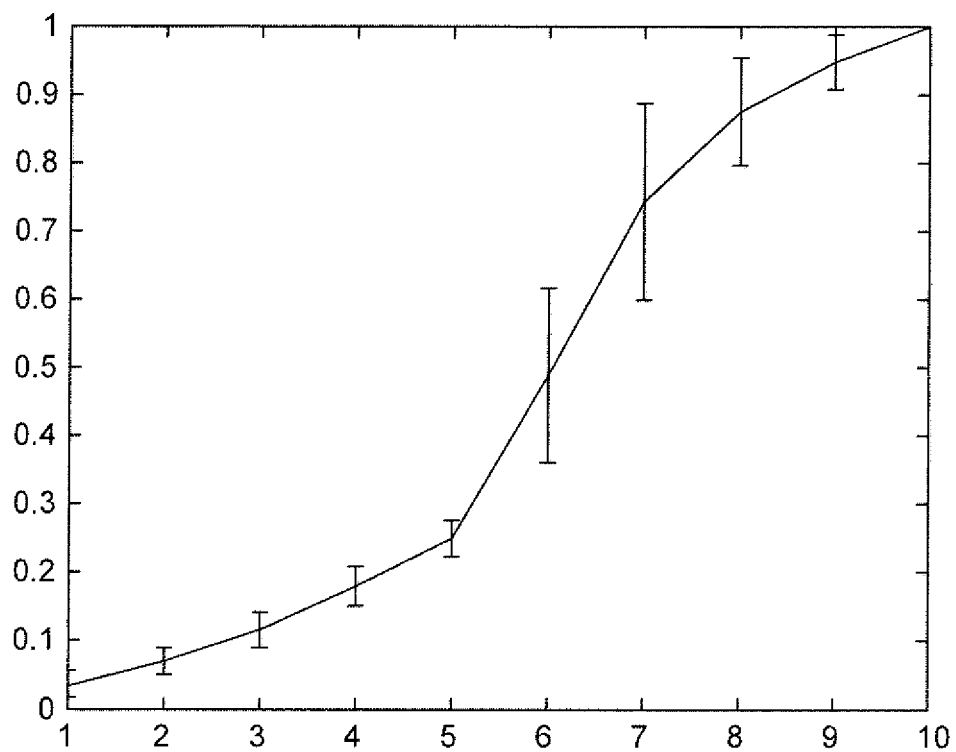
FIG. 11 illustrates a cumulative histogram of good (or acceptable) images.
Figure 12:
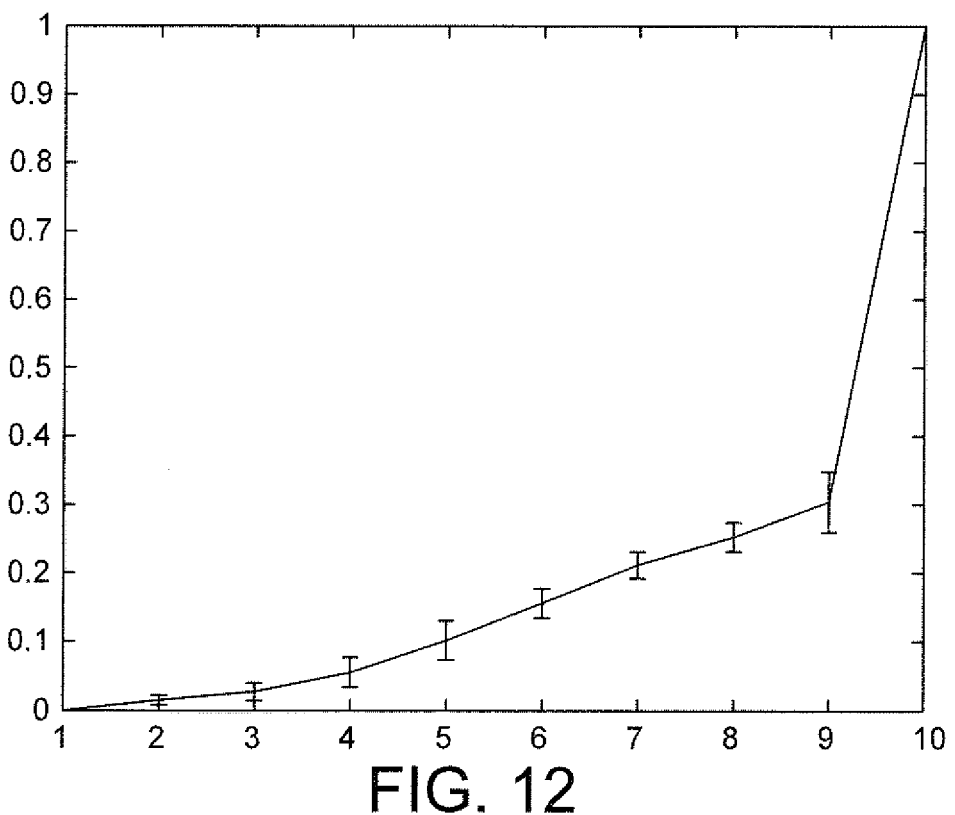
FIG. 12 illustrates a cumulative histogram of washed-out images.
Figure 13:
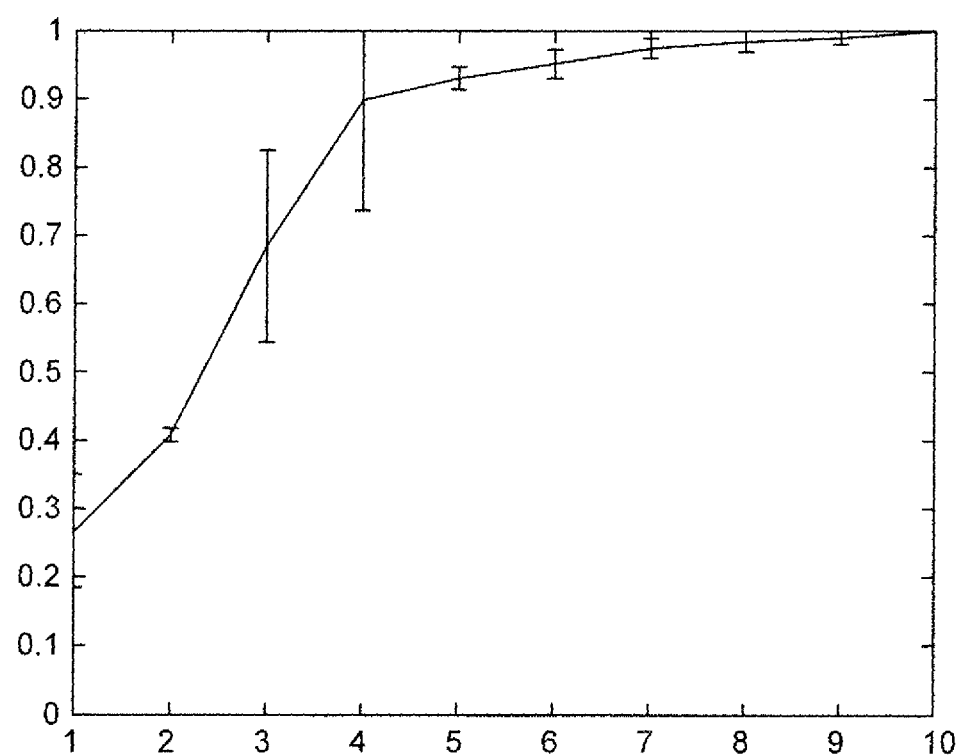
FIG. 13 illustrates a cumulative histogram of images including relatively darker regions.

In order to further illustrate the differences between histograms of good (FIG. 11), washed out (FIG. 12) and dark (FIG. 13) tonal range images, cumulative histograms are plotted for a range of these images with error bars to show spread of data. A cumulative histogram is an accumulated sum of a number of pixels in each luminance bin. Ten luminance bins from black to white are on the x axis, with the cumulative percentage of the pixels in the image on the y axis. For example, in FIG. 13, between 80% and 100% luminance, <=15% of the pixels are preferred to be in that region. In fact about 70% of the pixels are in that region (1.0–0.3) so a tone correction (FIG. 7) is performed to change the number of pixels in the highlight region to be <=15%.

Figure 14A:
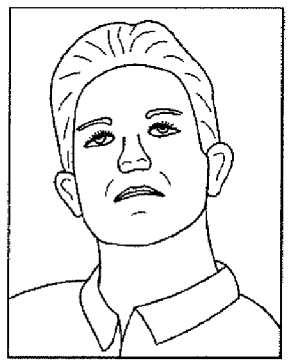
FIGS. 14A and 14B illustrate an image include a relatively high level of noise.
Figure 15A:
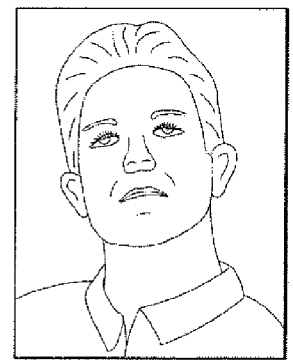
FIGS. 15A and 15B illustrate corresponding images— after smoothing of the FIGS. 14A and 14B images—including a relatively lower level of noise.
Figure 14B:
Figure 15B:
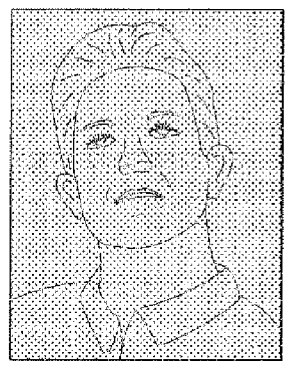
Figure 14C:
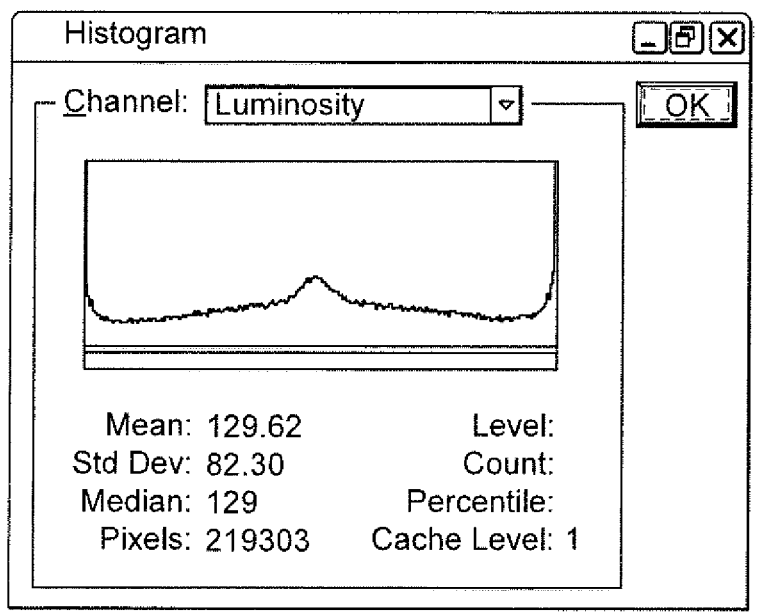
FIG. 14C illustrates a corresponding histogram.
Figure 15C:
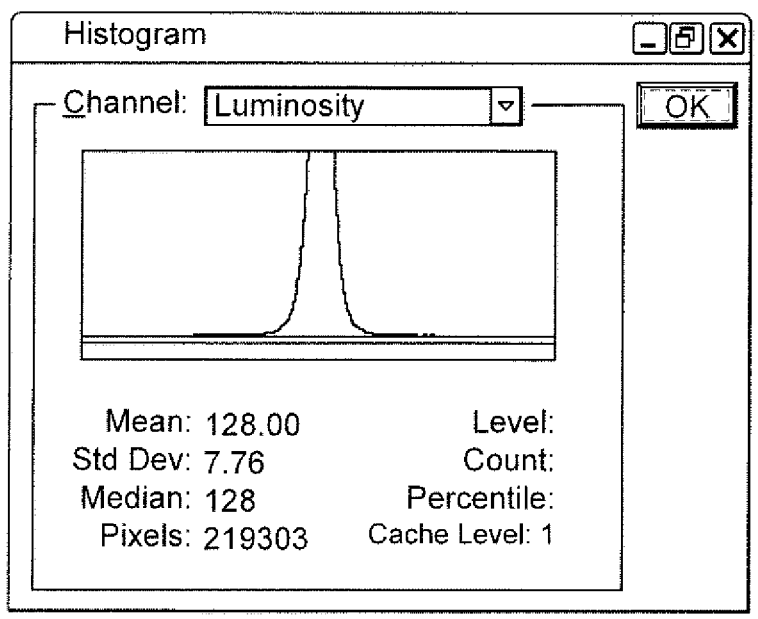
FIG. 15C illustrates a corresponding histogram.

While we have made image changes based on luminance or tonality considerations, we can also apply our techniques to other image criteria. For example, if an image is too busy or noisy (or, alternatively, not busy or noisy enough)—relative to the business or noisiness of a typical image—we can modify the image to better receive digital watermarking in anticipation for the expected printer and scanner (or in anticipation for expected signal processing, like filtering, etc.). FIGS. 14A and 14B illustrate a noisy image, which is smoothed (FIGS. 15A and 15B) prior to watermark embedding and printing. (The term "smoothed" implies a filtering process, like a Gaussian or Weiner filter, or wavelet based filter.). Corresponding histograms are shown in FIGS. 14C (noisy image) and 15C (smoothed image) respectively.

Another image analysis identifies compression artifacts that are anticipated to be introduced in a later workflow process. We correct an image to compensate for such anticipated artifacts, prior to watermark embedding.

Another implementation of our technology allows a user to identify an expected workflow process. A library of response curves is queried to identify a corresponding response curve for the identified workflow process. A received digital image is analyzed relative to the corresponding response curve.

Conclusion

The foregoing are just exemplary implementations of the present invention. It will be recognized that there are a great number of variations on these basic themes. The foregoing illustrates but a few applications of the detailed technology. There are many others.

The section headings in this application are provided merely for the reader's convenience, and provide no substantive limitations. Of course, the disclosure under one section heading may be readily combined with the disclosure under another section heading.

To provide a comprehensive disclosure without unduly lengthening this specification, each of the above-mentioned patent documents are hereby incorporated by reference. The particular combinations of elements and features in the above-detailed embodiments are exemplary only; the interchanging and substitution of these teachings with other teachings in this application and the incorporated-by-reference patent documents are expressly contemplated.

Additional digital watermarking methods and systems are disclosed in Appendix A, which is hereby incorporated by reference. Appendix A provides even further discussion of the methods, systems and apparatus discussed in the body of this application.

Many of the above-described methods and related functionality can be facilitated with computer executable software stored on computer readable media, such as electronic memory circuits, RAM, ROM, EPROM, flash memory, magnetic media, optical media, magnetic-optical media, memory sticks, hard disks, removable media, etc., etc. Such software may be stored and/or executed on a general-purpose computer, or on a server for distributed use. Also, instead of software, a hardware implementation, or a software-hardware implementation can be used.

In view of the wide variety of embodiments to which the principles and features discussed above can be applied, it should be apparent that the detailed embodiments are illustrative only and should not be taken as limiting the scope of the invention.

APPENDIX A

Automatic Pre-Processing after Image Robustness Analysis

1. Introduction

A characteristic response curve of an imaging system is measured, to determine system linearity. Images to be watermarked are analyzed to check if a prescribed target minimum of pixels (e.g., 70% or more of the pixels) are in a linear section of the imaging system response. When this criterion is met, the image data is left unchanged. However when it is not met, a tone correction is calculated and applied to the image data so the prescribed target minimum of the pixels are in the linear portion. The automatic pre-processing of these problem images increases their robustness and reduces variance in robustness of a set of watermarked images.

Within the same class of media some Works are much more amenable to digital watermarking than are others. A concrete example of this occurs for the class of watermarking techniques based upon correlation. For the case of an embedder of Cox, Miller, and Bloom (see documents mentioned at the end of Appendix A), a different watermark gain is applied to each individual Work in a set of images according to the level of pre-existing correlation between the Work and the watermark pattern that is to be embedded.

It is more difficult to make the kind of informed embedding modification mentioned above in watermarking systems that require printing and image re-acquisition. Typically one seeks to appropriately model a combined print/image acquisition channel in terms of how it affects the ability of a given Work to hold a watermark. The model can be used to improve the efficacy of the system by adaptively changing the applied watermark in some fashion as in informed embedding.

In this Appendix A we describe a two act procedure for image watermarking in environments where images are printed and ultimately reacquired using an image capture device such as a scanner or digital camera. The first act includes pre-conditioning the image, if necessary, so that it is more suitable for watermarking. The second act involves embedding the watermark as normal. One example of pre-processing media prior to watermarking was presented by Cox, et. al (see references mentioned at the end of Appendix A). As will be appreciated, the Cox, et al. type of preprocessing, and the purpose of its employment in their application, is different than that described herein. In the next section we develop the need for preprocessing as it applies to the watermarking system of interest. The details of the algorithm are provided in section 3. Section 4 deals with experiments and corresponding results.

2. Need for Preprocessing

Non-linear amplitude modifications that occur as a result of document printing and re-acquisition can pose problems of consistency in watermarking applications. Such non-linearities can be compensated for by characterizing the devices and making adjustments to counteract their effects. For example many manufacturers use color profiles to correct the response of the printer and image capture device (see references mentioned at the end of Appendix A).

However in many cases a watermark capture and/or print device are not adequately corrected and are outside the control of the watermarking application. In this case the captured image can be analyzed for its ability to hold a watermark, taking into account the response of the capture device and output printer.

Figure 16:
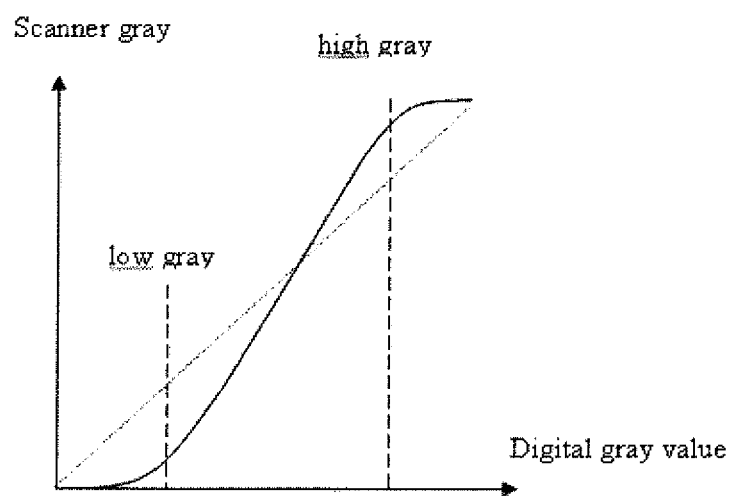
FIG. 16 illustrates an imaging system characteristic response curve.

In order to characterize the non-linearities in the system a set of gray patches that linearly span the range from 0 to 255 (black to white) are output using the target printer and substrate. The patches are then re-acquired (e.g., optically scanned) and an average luminance of each patch is measured. The response of an example system is shown in FIG. 16. As is usually the case, saturation is seen in the highlight and shadow regions of the imaging system response curve, with an approximately linear portion that covers a range between points labeled low gray and high gray.

It can be seen from FIG. 16 that large modifications to a digital image in areas less than low gray or greater than high gray are mapped to small effective changes in the reacquired image. This implies that images with a large concentration of pixels in the low gray and/or high gray areas tend to require a higher watermark gain in order to achieve the same robustness as images with smaller concentrations in these regions. For the purpose of our discussion we refer to an additive spatial domain spread spectrum watermark, but the same comments apply to other watermark types as well.

From a system perspective, where it may be desirable to achieve a certain robustness target for a large set of documents, global watermark strength is set high so that the watermark can be recovered for the case of those images that contain an unusual number of pixels in the non-linear regions. This would be done to address individual cases that suffer from saturation. An example application is watermarking identity documents where a very large number of digital images from disparate sources must be dealt with. A problem with using a global watermark gain for all images in order to satisfy a robustness requirement is that most images will be watermarked more strongly than is necessary.

A better solution is to customize the application of the watermark for each image in the set. Although it is possible to increase watermark gain in problem areas, a better approach is to adjust low gray/high gray regions to lie within a linear range of a printer/re-acquisition system prior to applying digital watermarking.

3. Image Tone Correction Algorithm

Figure 17:
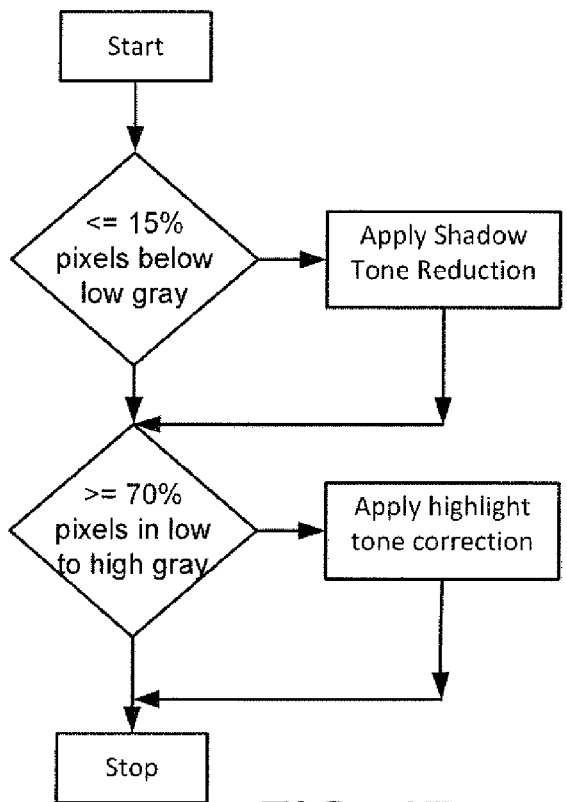
FIG. 17 illustrates an image analysis algorithm flow diagram.

In order to deal with images that have significant saturation problems, we have developed methods and systems that applies a tone correction to bring about 70% of the pixels into the linear region of the printer/re-acquisition response curve. To ensure that about 70% of the pixels in an image fall in the approximately linear region, the procedure shown in FIG. 17 is used. Images without significant saturation problems would pass through the procedure unchanged. For predominantly light or dark images, the correction is automatically applied prior to watermarking resulting in more consistent watermark detection. For color images, the image is converted to grayscale to determine the amount of correction to be applied; then the same correction is applied to all channels.

Figure 18:
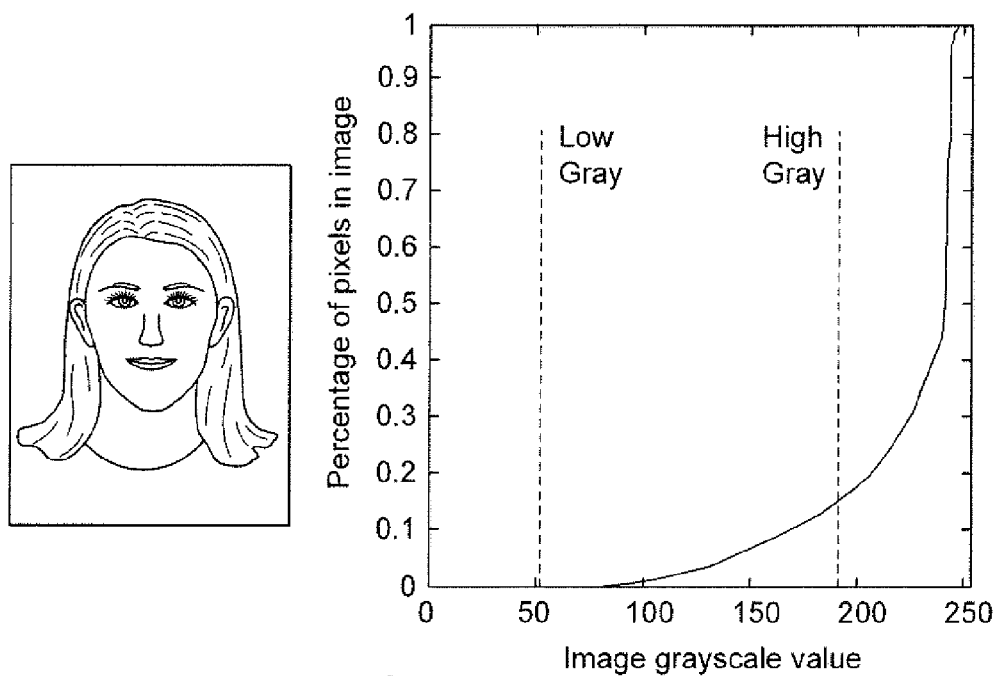
FIG. 18 illustrates an image with significant highlight content and a corresponding histogram. The histogram plots image grayscale values against percentages of pixels in the image.
Figure 19:
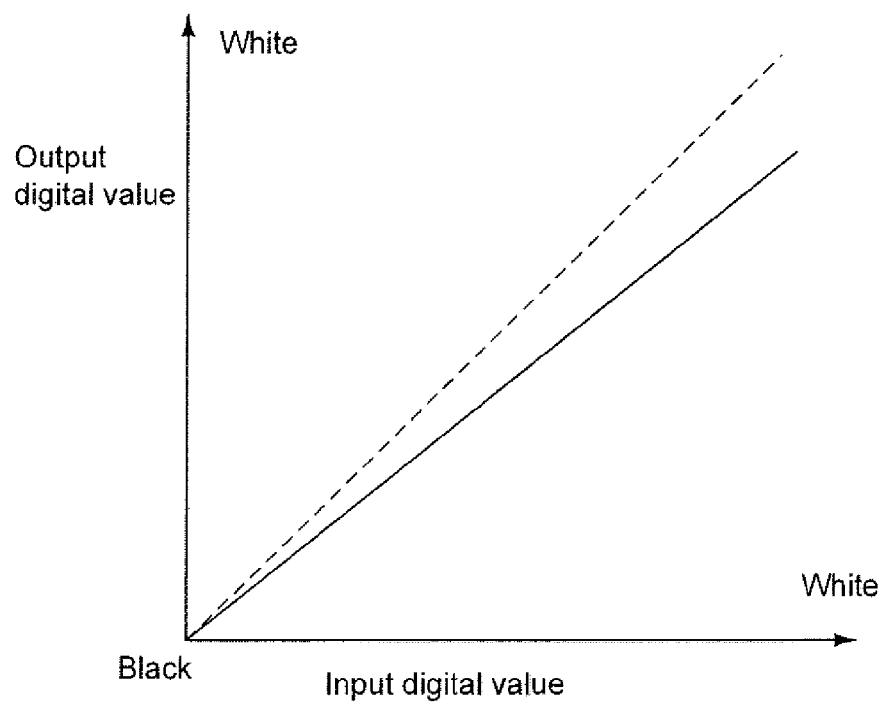
FIG. 19 illustrates a tone correction calculated for an image (Appendix A, FIG. 3) with significant highlight content.
Figure 20:
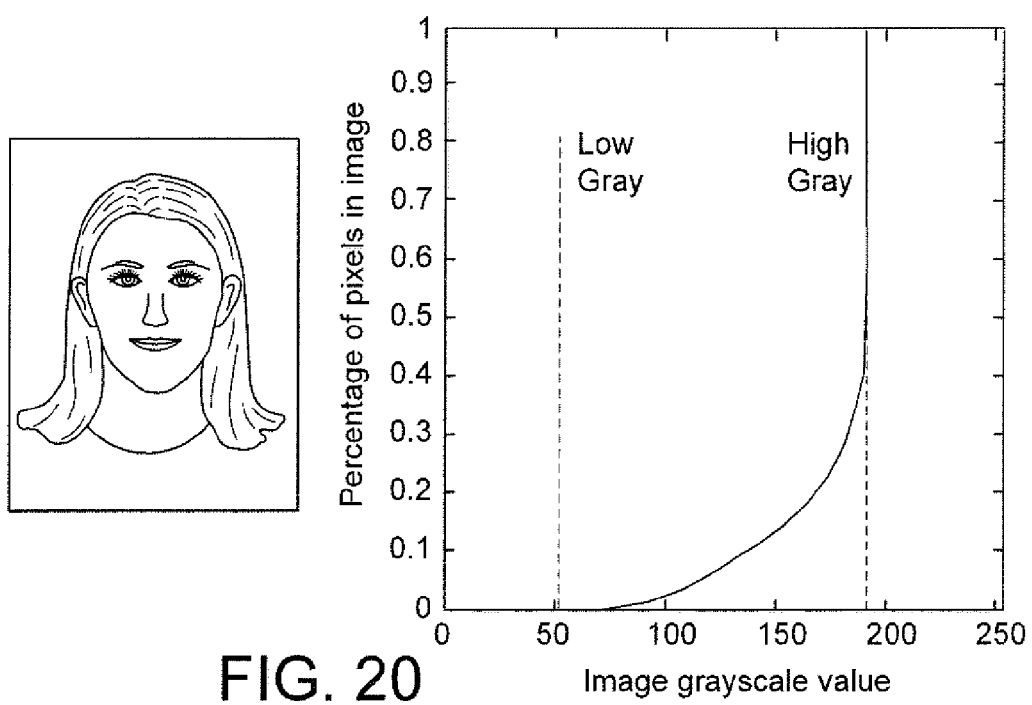
FIG. 20 illustrates an image with significant highlight content and its histogram after tone correction of FIG. 19. The histogram shows how pixels values have moved relative to the histogram in FIG. 18.

An example of an image with saturation problems in the highlights is shown in FIG. 18 with its corresponding histogram. In the absence of tone correction, this image would require large (or intense) watermark signal gain in order for the watermark to be detected after the image is passed through the system characterized by FIG. 16. FIG. 19 depicts the tone correction that is applied to the image when it is subjected to the method described in FIG. 17. The resulting corrected image and histogram are shown in FIG. 20

The overall effect of the described pre-processing methods is to reduce the contrast in problem images. If a saturation problem lies mainly with the printer, the algorithm preferably has a negligible visual impact. If, on the other hand, a capture device is the main limiter, the image contrast will appear reduced. A tradeoff here is whether noise due to watermarking for all images is more or less objectionable than reduced contrast in some images.

4. Experiments and Discussion

We conducted an experiment in which a set of 40 images, typical of identity document portraits, were embedded at constant watermark strength after applying the tone correction algorithm described in the previous section. Results are compared against a control set whereas the same set of images were embedded using the same watermark strength in the absence of preprocessing. We used an HP DeskJet 970Cxi with high quality setting to print the images on Hammermill paper. The images were acquired using an HP scanner at 300 dpi. The imaging system used for our experiment has a characteristic response curve with fewer saturation problems than we would expect most practical systems to have.

Figure 21:
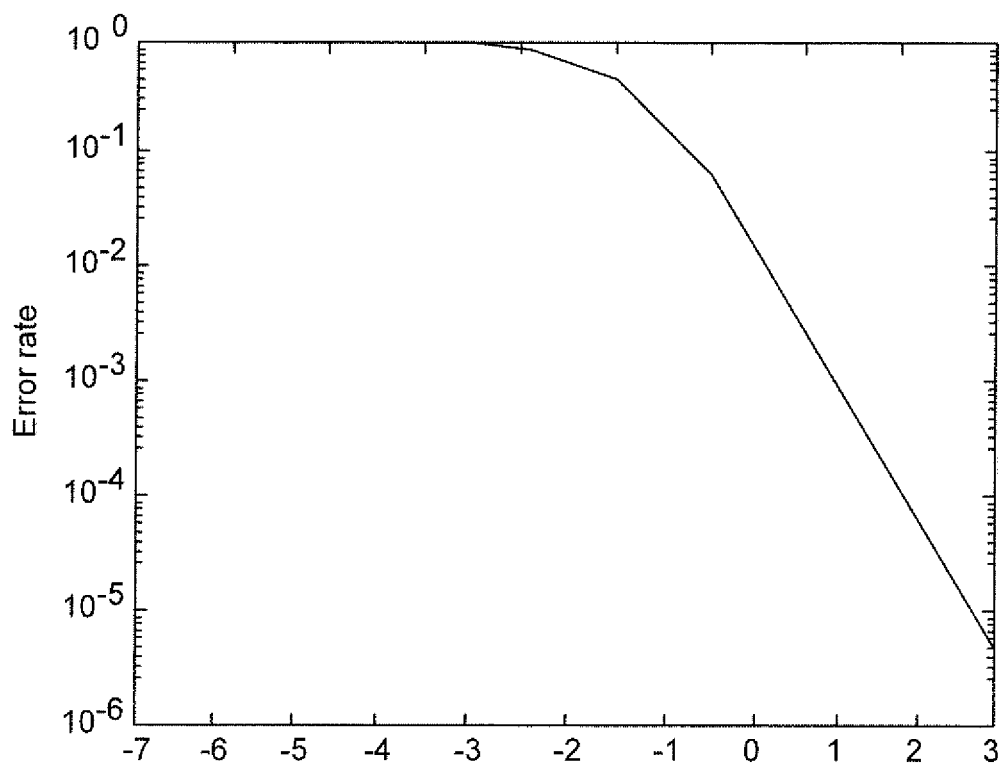
FIG. 21 illustrates an error rate for a watermark including 96 payload bits.

The figure of merit we used to evaluate each dataset is its empirical distribution of signal to noise ratio (SNR). For the watermarking system considered in this paper, the ultimate step in watermark reading is payload recovery, which inevitably requires error correction decoding. For even more details please see the cited references [4], [5]. SNR is a measure of strength of the recovered coded payload bits from a given image just prior to being submitted to the decoder. Each such SNR measurement corresponds to a probability of making errors in the decoding of an N bit watermark. An instance of this correspondence is shown in FIG. 21 for a payload of 96 bits. The figure shows that if the SNR for a particular case is −1 dB, the probability of not decoding the payload is roughly 10%.

In general, SNR distributions with higher mean and smaller variance lead to better robustness. Of particular importance is the portion of the SNR distribution lying below the mean since this section affects robustness the most.

The relationship between a dataset's SNR distribution and its overall error rate (r) is given by the following equation:

$$r = \sum_{i=1}^{M} p(SNR_i)d(SNR_i) \quad (1)$$

In equation (1), the variable i indexes all M non-zero values of a datasets' SNR distribution, which is represented by $p(SNR_i)$. The variable, $d(SNR_i)$ is the probability of not decoding the payload at the SNR level indexed by i. In general, SNR distributions with higher mean and smaller variance have better robustness. Of particular impact is the portion of the SNR distribution lying below the mean because it affects robustness the most.

Figure 22:
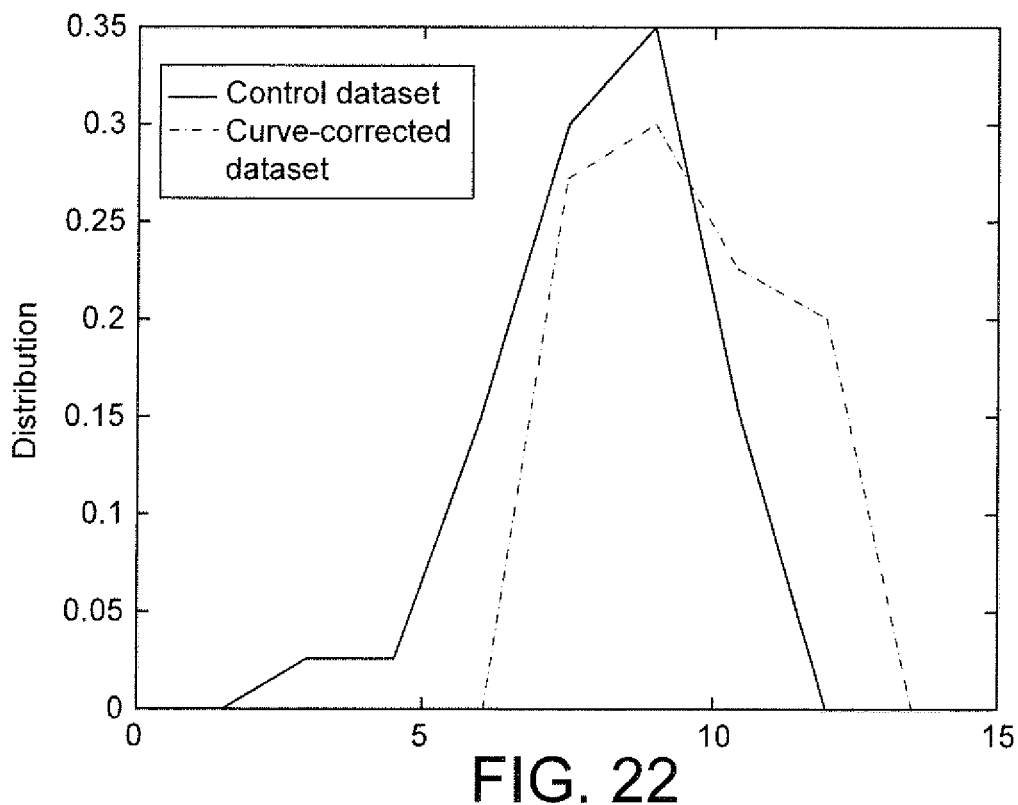
FIG. 22 illustrates SNR distributions of two datasets.

The empirical distributions of SNR for the control and curve corrected datasets are shown in FIG. 22. By applying equation 1 to the two datasets we find that the control dataset's error rate is approximately $6 \odot 10^{-7}$, while that of the curve corrected dataset is $<10^{-9}$. The difference in the two error rates is due to the fact that the lower tail of the control dataset's distribution is significant in extent while that of the curve corrected set is minimal.

5. Conclusions

By measuring the characteristic response curve of an imaging system and analyzing images to check if about 70% or more of the pixels in the image are in the linear portion, problem images for watermarking can be identified. These problem images are pre-processed by applying a tone correction to the image data so that at least 70% of the pixels are in the linear portion of the imaging system. Images that already have 70% or more of the pixels in the linear portion are left unchanged.

The automatic pre-processing of these problem images increases the robustness of the watermark in this case. A set of images were processed in this manner, and the watermark robustness was compared to the case when no pre-processing was applied. The automatic pre-processing of these problem images increases their robustness and reduces the variance in robustness of a set of watermarked images.

The use of this method enables a required detection rate to be obtained at significantly lower watermark strength, thus reducing watermark visibility. Alternatively, by pre-processing the outlier images a significantly higher detection rate can be achieved at approximately the same visibility.

6. Additional References

Each of the following documents is herein incorporated by reference: [1] Cox, I. J., Miller, M. L., and J. A. Bloom, *Digital Watermarking*, Morgan Kaufmann Publishers, San Diego, 2002; [2] I. J. Cox, M. L, Miller, "Preprocessing media to facilitate later insertion of a watermark," *DSP 2002*, Santorini, Greece, Jul. 1-3, 2002; [3] D. McDowell, "Color Management: What's New from The ICC," *The Pre-Press Bulletin*, pp. 4-8, November/December 2001; [4] A. M. Alattar, "'Smart Images' Using Digimarc's Watermarking Technology," *Proc. IS&T/SPIE's 12th International Symposium on Electronic Imaging*, vol. 3971, number 25, pp. 264-273, January 2000; and [5] B. A. Bradley and H. Brunk, "Comparative performance of watermarking schemes using M-ary modulation with binary schemes employing error correction coding," *Proc. SPIE Electronic Imaging, Security and Watermarking of Multimedia Content III*, vol. 4314, San Jose, Calif., January 2001.

APPENDIX B

U.S. Provisional Application No. 60/620,093

Watermark Embedding and Detection in Optimized Color Space Direction

RELATED APPLICATION DATA

This application is related to the following U.S. Pat. Nos. 6,804,377, 6,763,124, 6,700,995, 6,633,654, 6,614,914, 6,590,996, 6,122,403 and 5,862,260, which are each hereby incorporated by reference.

TECHNICAL FIELD

The disclosure relates to image processing and specifically relates to color image processing.

BACKGROUND AND SUMMARY

In color image processing applications, it is useful to understand how humans perceive colors. By understanding the human visual system and its sensitivity to certain colors, one can more effectively create and manipulate images to create a desired visual effect. This assertion is particularly true in image processing applications that intentionally alter an image to perform a desired function, like hiding information in an image or compressing an image. In digital watermarking, for example, one objective is to encode auxiliary information into a signal, such as an image or video sequence, so that the auxiliary information is substantially imperceptible to humans in an output form of the signal. Similarly, image compression applications seek to decrease the amount of data required to represent an image without introducing noticeable artifacts.

A useful tool in watermark embedding and reading is perceptual analysis. Perceptual analysis refers generally to techniques for evaluating signal properties based on the extent to which those properties are (or are likely to be) perceptible to humans (e.g., listeners or viewers of the media content). A watermark embedder can take advantage of a Human Visual System (HVS) model to determine where to place an image watermark and how to control the intensity of the watermark so that chances of accurately recovering the watermark are enhanced, resistance to tampering is increased, and perceptibility of the watermark is reduced. Similarly, audio watermark embedder can take advantage of a Human Auditory System model to determine how to encode an audio watermark in an audio signal to reduce audibility. Such perceptual analysis can play an integral role in gain control because it helps indicate how watermark embedding can be adjusted relative to the impact on the perceptibility of the mark. Perceptual analysis can also play an integral role in locating the watermark in a host signal. For example, one might design the embedder to hide a watermark in portions of a host signal that are more likely to mask the mark from human perception.

The disclosure relates to selective color digital watermark embedding of images.

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as image signals, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The physical manifestation of altered host media most commonly takes the form of altered signal values, such as slightly changed pixel values, image luminance, color or color values, picture colors, altered DCT or transform domain coefficients, etc. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed, e.g., in assignee's above-cited patent documents.

A watermark encodes auxiliary information in an image by modifying attributes of image samples in the image. As part of the encoding process, the encoder computes a change in an image attribute, such as luminance, to an image sample to encode auxiliary information in the image. The encoder changes color values of the image sample to effect the change in luminance with minimized impact on visibility.

One aspect of the disclosure provides a method of encoding auxiliary information in an image. The method includes computing a change in an attribute of an image sample to encode auxiliary information in the image; and changing color values of the image sample to effect the change in the image sample attribute. The changes to color values are determined based at least in part on both: i) visibility of the changes, and ii) anticipated watermark detection.

Another aspect of the disclosure is a method of decoding auxiliary information encoded in an image. The method includes receiving optical scan data corresponding to the image. The scan data includes first data corresponding to a first color channel, second data corresponding to a second color channel and third data corresponding to a third color channel. The method further includes weighting the first data, the second data and the third data according to at least the following two factors: i) a color direction anticipated to correspond with the embedding; and ii) anticipated image distortion introduced to the first data, second data or third data through optical scanning or signal processing. The method then includes determining from the weighted first data, second data and third data, changes in an image sample attribute, wherein the auxiliary information is conveyed through the changes.

According to still another aspect, a watermark embedding method includes: i) receiving an image including a generally white region; ii) determining a color change to embed a portion of a watermark signal in the white region in terms of a yellow channel; and iii) offsetting the yellow channel change in the white region with color changes in the cyan and magenta channels of the white region.

Further features of the technology will become even more apparent with reference to the following detailed description and accompanying drawings.

DETAILED DESCRIPTION

Two constraints may influence digital watermark embedding: 1) HVS; and 2) watermark detection. Digital watermarks are preferably embedded to reduce or minimize visibility of the watermark. A HVS model can be used to guide embedding to reduce visibility. A watermark can also be embedded to ease watermark detection. If an image sensor used in watermark detection is known to loose information (e.g., through compression or noise) in a particular color channel, a watermark can be embedded in certain color channels to combat the information loss.

Relative sensitivity of the human visual system (HVS) to luminance, red/green or blue/yellow signals often depends on a spatial frequency of the signals. Consider a sine wave. If a sine wave is added to a flat gray RGB image, the relative weightings of R:G:B to minimize visibility to the HVS is dependent on the spatial frequency of the sine wave. For example, adding signal changes equally (1:1:1) into the flat grey RGB image, to accommodate the sine wave, will create a luminance change that maximizes the visibility of the signal. An unequal distribution of the sine wave between the RGB color channels will result in a more visibly appealing image.

If HVS factors are the only considerations for watermark embedding, then one may be tempted to embed in a yellow channel, since human sensitivity to yellow is very low. But real world constraints force consideration of other factors—like image sensors. (Remember that a typical watermark detection process analyzes image data collected from an optical sensor.)

In an ideal world, where optical sensors (sometimes hereafter referred to as "image sensors") are "ideal," a watermark reader is preferably configured to look in the same color direction as the hidden watermark signal is embedded. This maximizes detectability. For example, if a printed image includes a watermark embedded only in a yellow channel, then an watermark detector preferably reads the watermark using image data only from a blue channel, since increasing the amount of yellow ink (via the watermark in the yellow channel) results in more light being absorbed (detectable in the blue channel).

As the quality of an image sensor moves away from ideal, other factors for watermark embedding are preferably considered to ensure a balance between visibility and detectability. For example, it may not be feasible to sample data only from the blue channel. Many of today's digital cameras and image sensors have a lower sampling frequency in blue and red, than in green (due, e.g., to a Bayer pattern imaging approach). The blue channel is also a favor target for compression algorithms—often resulting in information loss in the blue channel. Noise and channel distortion may also affect detectability.

Thus, while embedding a watermark only in a yellow channel might provide favorable results in terms of visibility, detection of such yellow channel watermarks may be hampered by real world constraints.

Accordingly, we preferably distribute our watermark signal across color channels of an image, while primarily providing our watermark signal in the blue-yellow direction. This embedding technique minimizes visibility of the signal, especially at a higher spatial frequency.

Embedder Optimization

Figure 23:
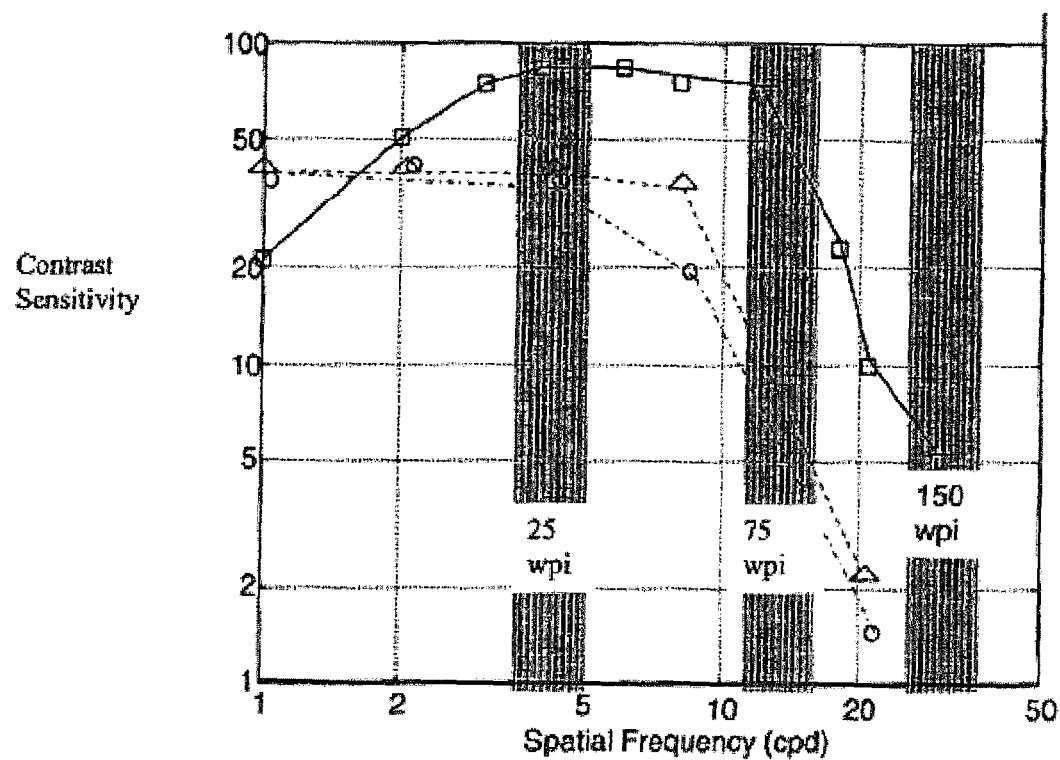
FIG. 23 is a diagram showing human contrast sensitivity at various watermark embedding spatial frequencies.
Figure 24:
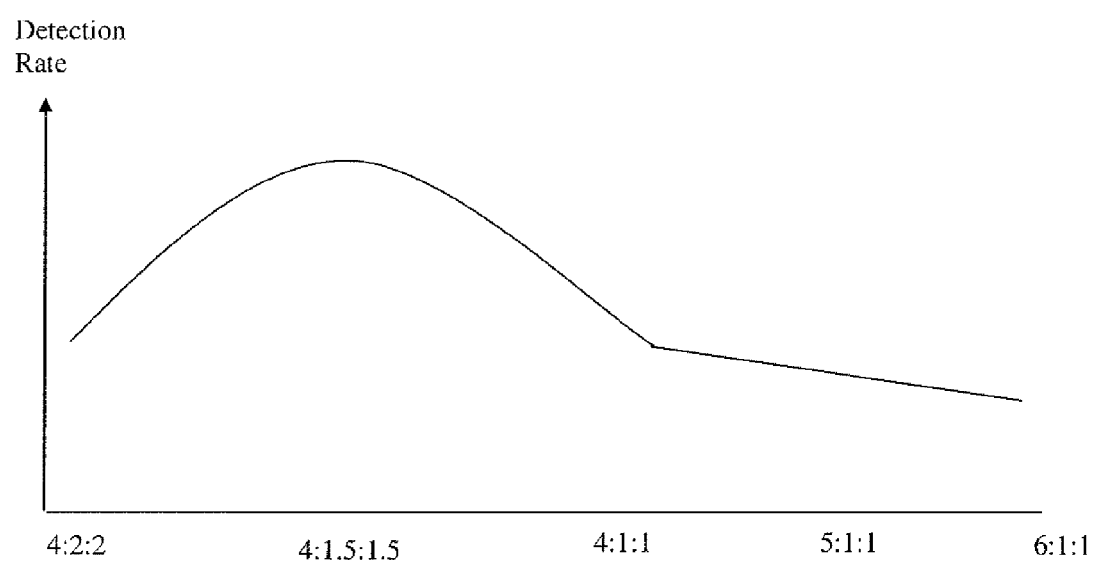
FIG. 24 is a diagram illustrating detection rates for various watermark detection weightings for RGB channels.

A similar argument can be used with a digital watermark which has a certain dominant spatial frequency (represented in terms of "wpi"). A dominant spatial frequency for a 25 wpi, 75 wpi and 150 wpi watermark are shown in FIG. 23 above for a printed image with a viewing distance of 9-12 inches. The difference in visibility between embedding in the blue/yellow direction or the luminance direction is strongly dependent on the dominant spatial frequency or wpi of the watermark. For example when embedding at 25 wpi the difference in human contrast sensitivity is about a factor of 2, whereas at 75 wpi it is about a factor of 15.

An additional constraint is that a watermark is preferably detectable by a grayscale scanner. Thus, the optimum RGB weightings for inserting an energy watermark (e.g., energy in the grayscale domain), while minimizing visibility to the human eye, depend on this relative sensitivity. In the 75 wpi case this can be approximately achieved by having a ratio of 1:1:15 for the R:G:B watermark energy (see discussion of 75 wpi in the above paragraph for the 15 weightings).

The arguments above for RGB images also apply to printed CMYK images, where cyan corresponds to red, magenta to green and yellow to blue and black is left unchanged.

One method calculates a watermark tweak (or changes to an attribute of a host image, e.g., at a particular spatial area or frequency representation), and determines a ratio for CMYK printing ink to represent the changes. We note that attribute changes can be represented in terms of color changes. We prefer that the color changes preserve the original attribute changes. For example, if the attribute is luminance, the color changes to different channels of the image preferable preserve the corresponding change in luminance.

$$C'=C+K-C*K/255, \quad (1)$$

where C' is an ink value with black included, and C is ink values without black included. M' and Y' values are readily obtainable from the above example.

$$C-CtweakA=(C-Ctweak)+K-(C-Ctweak)*K/255. \quad (2)$$

where CtweakA is a tweak (or watermark value adjustments) with black included to produce a luminance tweak deltaL. MtweakA and YtweakA follow accordingly.
Subtracting (1) from (2) yields:

$$CtweakA=Ctweak-Ctweak*K/255. \quad (3)$$

Required tweak deltaL is a weighted sum of the C, M and Y tweak with black included $$deltaL=0.2*CtweakA+0.5*MtweakA+0.2*YtweakA$$

Then to obtain ratio of 16:1:1 for Y:M:C=>YtweakA=16 CtweakA, MtweaKA=CtweakA $$deltaL=0.3*CtweakA+0.5*CtweakA+0.2*16*CtweakA$$

$$CtweakA=deltaL/4. \quad (4)$$

Substituting (3) in (4) yields:

$$deltaL/4=Ctweak*(1-K/255)$$

$$Ctweak=(deltaL/4)/(1-K/255)$$

Related calculations for magenta and yellow yield:

$$Mtweak=(deltaL/4)/(1-K/255)$$

$$Ytweak=deltaL/(1-K/255).$$

In our preferred implementation, we represent an attribute change with four times the yellow relative to the change in the cyan and magenta channels. We have also found acceptable ranges of 16-2 times the yellow channel relative to the change in the cyan and magenta channels. We of course recognize that this range may vary given different detection channel characteristics.

For an ideal image sensor the ratio of signal in the yellow channel is preferably maximized since this minimizes the visibility of a watermark of given energy (measured in terms of variation of luminosity). A problem that occurs in practice when embedding in yellow is when the signal is railed by reaching 0% or 100% ink value. Visually this effect is severest close to white, where the positive tweaks increasing yellow ink outnumber the negative tweaks which are railed by reaching 0% ink. The result is a highlight with a yellow cast or hue (compared to a gray cast with a luminance tweak). One approach avoids this problem by determining an amount of yellow that is railed (e.g., an amount of yellow ink that could not be subtracted) and add this amount as cyan and magenta ink to the tweaked image region to maintain approximately the correct color balance. The addition of cyan and magenta can be added, e.g., as noise or background coloration. To a first approximation the added cyan and magenta coloration does not interfere with the detection process which selects mostly the blue channel of the sampled image data.

A similar railing effect occurs close to 100% where the negative tweaks outnumber the positive tweaks that are railed by reaching 100% ink. This blue cast can also be corrected in a similar manner, but is often less objectionable visually and may not require correction.

An adaptive embedding method could change from mainly yellow embedding to a more neutral color balance as yellow tends towards to zero. The detector would be adaptive in a similar manner, but implies less than ideal detection in the highlights since definition of 0% yellow/blue would probably be different in the detector.

In one implementation, optimum color channel weightings (R:G:B) for a corresponding image sensor system is determined empirically or calculated and then checked experimentally. In order to determine weightings empirically a reference, captured image is passed through the detector using several different sets of weighting coefficients going from a matched set with the ratio 1:1:15 to others which reduce the blue component (to reduce noise due to JPEG compression) or increase the green component to take advantage of the better camera resolution in green (due to Bayer pattern). The results are used to guide rations for both embedding and detecting.

Detector Optimization

Watermark detection using an ideal image sensor, which has low noise and equal sensitivity in red, green and blue, is preferably matched to the embedding color direction. This ideal assumption, and resulting matching assumption, unfortunately begins to fail when "real" sensors are considered. For example, while this ideal color direction matching assumption may hold true for a scanner that includes "approximately" the same resolution in all three color channels, it begins to break down for sensors such as consumer digital cameras or sensors in cell phone cameras. Many of these non-optimal sensors use a Bayer pattern (shown below) to detect RGB using a single CMOS sensor.

Bayer Pattern:
R G
G B

The red samples are interpolated to create a red color plane, and similarly for green and blue. The captured image is also usually JPEG compressed which loses more information particularly in the blue channel. In a "non-ideal" case, the best color direction for watermark detection is often not precisely matched to the embed color direction. For example, assigning a lower weight to the sub-sampled noisy blue channel should result in higher detection rates. (When we refer to "weights" (e.g., "4:1:1") we generally mean that the red channel is weighted 4 times to the green and blue channels.).

Weights can be determined to compensate for lost information due to, e.g., compression and known channel noise.

The optimum detector weights can be estimated by estimating the relative noise and sampling rates of the color channels or determined empirically by measuring the detection rate on an embedded image with a set of different weights that tend towards selecting more green and red. In this regard, a detector is calibrated according to sampled or empirically determined sensor characteristics.

Concluding Remarks

The foregoing are just exemplary implementations of the present invention. It will be recognized that there are a great number of variations on these basic themes. The foregoing illustrates but a few applications of the detailed technology. There are many others.

To provide a comprehensive disclosure without unduly lengthening this specification, applicants incorporate by reference, in their entireties, the disclosures of the above-cited patent documents. The particular combinations of elements and features in the above-detailed embodiments are exemplary only; the interchanging and substitution of these teachings with other teachings in this application and the incorporated-by-reference patents/applications are also contemplated.

The section headings in this patent document are provided for the reader's convenience and should not be interpreted as limiting the scope of the invention. Subject matter found under one subject heading can be readily combined with subject matter found under another subject heading.

There are many embodiments discussed herein which may benefit from the inclusion of two or more watermarks.

The methods, processes, and systems described above may be implemented in hardware, software or a combination of hardware and software. For example, the embedding and detection processes may be implemented in a programmable computer or a special purpose digital circuit. Similarly, such watermarking method may be implemented in software, firmware, hardware, or combinations of software, firmware and hardware. The methods and processes described above may be implemented in programs executed from a system's memory (a computer readable medium, such as an electronic, optical or magnetic storage device).

In view of the wide variety of embodiments to which the principles and features discussed above can be applied, it should be apparent that the detailed embodiments are illustrative only and should not be taken as limiting the scope of the invention.

What is claimed is:

1. A digital watermark embedding method comprising:
using a configured processor, analyzing a digital image relative to an expected workflow process, the workflow process comprising optical capture of a printed version of the digital image, the digital image comprising data representing process colors Cyan (C), Magenta (M) and Yellow (Y);
based on the analysis, applying tone correction to the digital image, said applying yielding an altered digital image;
using a configured processor, transforming the altered digital image with digital watermarking, the digital watermarking conveying a plural-bit message; and
providing the transformed, altered digital image.

2. The method of claim 1 in which the workflow process represents distortion attributable to optical capture.

3. The method of claim 2 in which the distortion comprises at least one of compression, noise or signal sampling.

4. The method of claim 1 in which the transforming introduces changes in chrominance, in which a set of changes are made to have an equivalent change in chrominance while being weighted differently among a plurality of color channels.

5. A non-transitory computer readable medium having instructions stored thereon to cause an electronic processor to perform the method of claim 1.

6. The method of claim 1 in which the digital image comprises data representing process colors CMY and Black (K).

7. An apparatus comprising:
electronic memory for buffering samples corresponding to a digital image;
means for analyzing a digital image relative to an expected workflow process, the expected workflow process comprising optical capture of a printed version of the digital image, the digital image comprising data representing process colors Cyan (C), Magenta (M) and Yellow (Y);
means for applying tone correction to the digital image, said means for applying yielding an altered digital image;
means for transforming the altered digital image with digital watermarking, the digital watermarking conveying a plural-bit message; and
a processor configured for providing the transformed, altered digital image.

8. The apparatus of claim 7 in which the workflow process represents distortion attributable to optical capture.

9. The apparatus of claim 8 in which the distortion comprises at least one of compression, noise or signal sampling.

10. The apparatus of claim 7 in which the transforming introduces changes in chrominance, in which a set of changes are made to have an equivalent change in chrominance while being weighted differently among a plurality of color channels.

11. The apparatus of claim 7 in which the digital image comprises data representing process colors CMY and Black (K).

12. A method comprising:
receiving data representing a digital image;
analyzing the data to determine whether the digital image is suitable for hosting encoded auxiliary information relative to an anticipated workflow process;
based on a result of said analyzing, transforming the digital image by altering the data, said transforming yielding a transformed digital image;
altering the transformed digital image by encoding auxiliary information therein, in which the auxiliary information is distributed in the data so as to be encoded in multiple different color channels of the digital image, said altering yielding an encoded digital image;
providing the encoded digital image for the anticipated workflow process.

13. The method of claim 12 in which the anticipated workflow process comprises printing the encoded digital image, the printing yielding a printed digital image which includes the auxiliary information encoded therein.

14. The method of claim 13 in which the anticipated workflow process further comprises a digital capture of the printed digital image.

15. The method of claim 12 in which said transforming comprises tone correcting at least a subset of pixels represented by the data.

16. The method of claim 12 in which said transforming comprises filtering the data with a Gausian, Weiner or wavelet-based filter.

17. The method of claim 12 further comprising obtaining a response curve from a library of response curves, in which said analyzing comprises analyzing the data relative to the obtained response curve.

18. The method of claim 12 in which the auxiliary information is distributed in the data so as to be encoded primarily in a blue-yellow direction of the digital image.

19. The method of claim 18 in which said altering utilizes digital watermarking.

20. The method of claim 19 in which the anticipated workflow process comprises printing the encoded digital image, the printing yielding a printed digital image which includes the auxiliary information encoded therein.

21. The method of claim 20 in which the anticipated workflow process further comprises a digital capture of the printed digital image.

* * * * *